W. E. HAYWARD.
DISH DRAINER.
APPLICATION FILED NOV. 2, 1911.
1,034,912.
Patented Aug. 6, 1912.
2 SHEETS—SHEET 1.
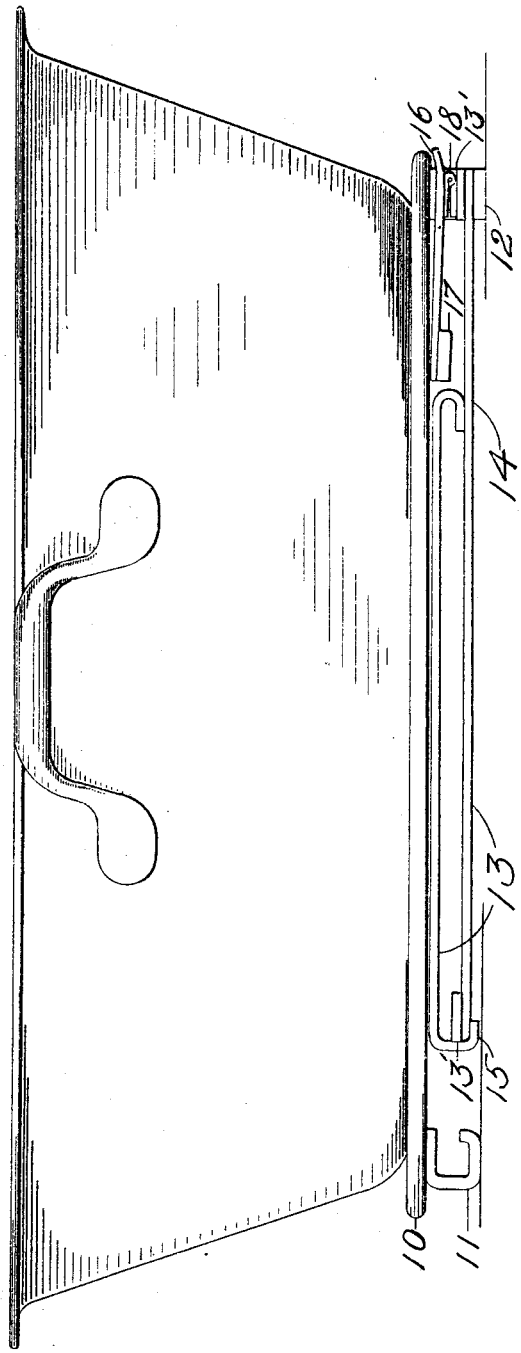
Witnesses
Chas. G. Lynch.
Harry M. Test.
Inventor
W. E. Hayward.
By Harry Ellis Chandlee
Attorney W. E. HAYWARD.
DISH DRAINER.
APPLICATION FILED NOV. 2, 1911.
1,034,912.
Patented Aug. 6, 1912.
2 SHEETS—SHEET 2.
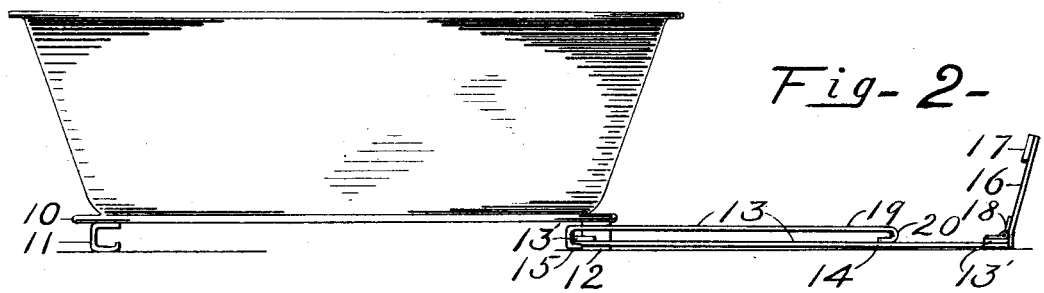
Fig-2-
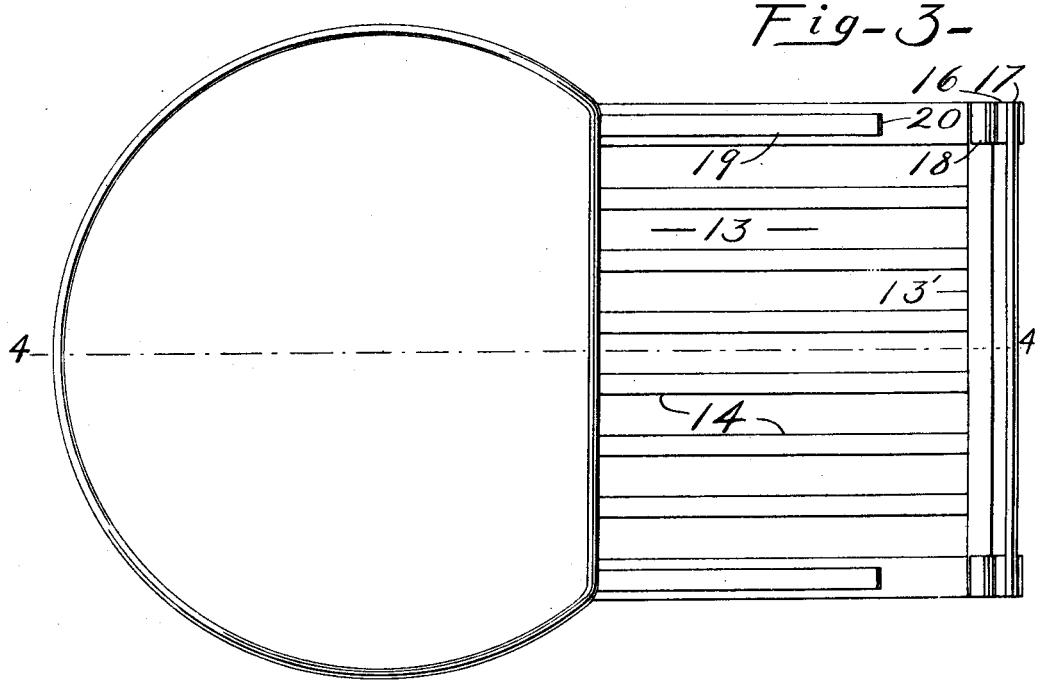
Fig-3-
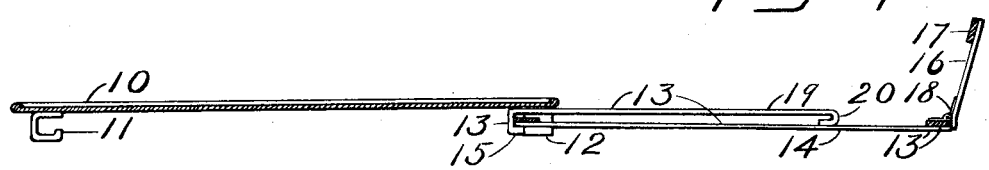
Fig-4-
Inventor
W. E. Hayward.
Witnesses
Chas. G. Lynch.
Harry M. Test
By Harry Ellis Chandler
Attorney

UNITED STATES PATENT OFFICE.

WALTER E. HAYWARD, OF DAMARISCOTTA, MAINE.

DISH-DRAINER.

1,034,912. Specification of Letters Patent. Patented Aug. 6, 1912.

Application filed November 2, 1911. Serial No. 658,172.

*To all whom it may concern:*

Be it known that I, WALTER E. HAYWARD, a citizen of the United States, residing at Damariscotta, in the county of Lincoln and State of Maine, have invented certain new and useful Improvements in Dish-Drainers, of which the following is a specification.

This invention relates to improvements in dish drainers.

The principal object of the invention is to provide a device on which a dish pan may be placed, and having means adapted to be withdrawn from beneath the pan on which to place the dishes which have been washed.

Another object is to provide means on the sliding member which is adapted to be moved upwardly on hinges so that dishes may be rested thereagainst.

Other objects and advantages will be apparent from the following description and with particular reference to the accompanying drawings.

In the drawings: Figure 1 is a side elevation of my device showing a dish pan rested thereon, and the rack withdrawn beneath the pan. Fig. 2 is a similar view showing the rack extended. Fig. 3 is a top plan view showing the rack extended. Fig. 4 is a section on the line 4—4 of Fig. 1. Fig. 5 is a section on the line 5—5 of Fig. 2.

Referring to the drawings the device comprises a platform 10 having the feet 11 and 12, the former of which is a single foot which may be either pressed out of the platform 10, or may be a separate piece riveted or soldered thereto. The feet 12 are secured to the bottom of the platform and receive slidably therebetween the drainer rack 13 which comprises a rectangular frame having the end bars 13′ and a series of longitudinal bars 14. On either end of the rear of the rack 13 are the turned down portions 15 which engage with the feet 12 to prevent the rack being drawn out too far. On the forward end of the rack are hinged the strips 16 which are connected at the outer ends by means of a cross strip 17 and form a railing against which dishes may be rested.

The hinges 18 are spring so that the railing will swing upwardly into place when the rack is drawn from beneath the pan. Sufficient space is allowed between the platform 10 and the rack so that the railing will have a normal tendency to spring upwardly against the frame and thus frictionally engage therewith and prevent the same accidentally sliding out.

On the outermost of the bars 14 are the longitudinally arranged spring fingers 19 each secured at one end to one end of each of the outer bars 14, and having their free ends terminating in a downturned portion 20 which elevate the fingers from the bars, said ends stopping a distance from the end of the bar approximately equal to the height of the railing. These fingers bear against the bottom of the platform 10 and against the rack, so that accidental sliding of the rack from beneath the platform, or rocking movement of the rack is prevented.

What is claimed is:

A dish drainer comprising a platform on which a dish pan is adapted to rest, feet on the platform, certain of said feet forming guides, a drainer rack slidably mounted between the guides, a hinged railing on one end of the rack, said railing having a normal tendency to spring upward, and spring spacing fingers on the rack whereby when the rack is retracted beneath the platform the fingers and railing will frictionally engage therewith.

In testimony whereof I affix my signature in the presence of two witnesses.

WALTER E. HAYWARD.

Witnesses:
O. I. THOMPSON,
JOHN HANSON.

Copies of this patent may be obtained for five cents each, by addressing the "Commissioner of Patents, Washington, D. C."